United States Patent [19]

Roll et al.

[11] 4,208,835

[45] Jun. 24, 1980

[54] HERBICIDE APPLICATOR

[75] Inventors: Dwight M. Roll, Roseau; Myron L. Kofstad, Warroad; Charles H. Habstritt, Crookston, all of Minn.

[73] Assignee: Roller, Inc., Roseau, Minn.

[21] Appl. No.: 895,627

[22] Filed: Apr. 12, 1978

[51] Int. Cl.² ............................................. A01C 23/00
[52] U.S. Cl. ...................................................... 47/1.5
[58] Field of Search .................. 47/1.41, 1.5; 111/6, 111/7, 10

[56] References Cited

U.S. PATENT DOCUMENTS

| | | | |
|---|---|---|---|
| 2,935,818 | 5/1960 | Crane | 47/1.5 |
| 3,143,839 | 8/1964 | Johnson | 47/1.5 X |
| 3,198,396 | 8/1965 | Bailey | 222/176 |
| 3,257,753 | 6/1966 | Zennie | 47/1.5 |
| 3,320,694 | 5/1967 | Biron | 47/1.5 |
| 3,651,600 | 3/1972 | Ewing | 47/1.5 |
| 3,728,817 | 4/1973 | Huey et al. | 47/1.5 X |
| 3,995,569 | 12/1976 | Picardat | 111/6 X |
| 4,019,278 | 4/1977 | McKirdy | 47/1.5 |

FOREIGN PATENT DOCUMENTS

| | | | |
|---|---|---|---|
| 2322538 | 1/1977 | France | 47/1.5 |
| 147753 | 8/1968 | New Zealand | 47/1.5 |

*Primary Examiner*—Paul T. Sewell
*Assistant Examiner*—James R. Feyrer
*Attorney, Agent, or Firm*—Merchant, Gould, Smith, Edell, Welter & Schmidt

[57] ABSTRACT

An apparatus for applying herbicide to tall weeds which extend above a line formed by the upper reaches of desirable crops is disclosed. The apparatus includes a pair of hydraulic rams for elevating and lowering a rotatably mounted roller which has a covering of nap material such as nylon-dacron carpeting for facilitating the adherence of the herbicide thereto. A fluid pressure system or systems for controlling the flow rate of herbicide to the roller and for controlling the rotational speed of the roller is provided so that the herbicide application characteristics of the apparatus can be varied in accordance with the weed density and height conditions encountered. A wiper for spreading the herbicide and for foaming the herbicide prior to application to the weeds can also be included.

18 Claims, 7 Drawing Figures

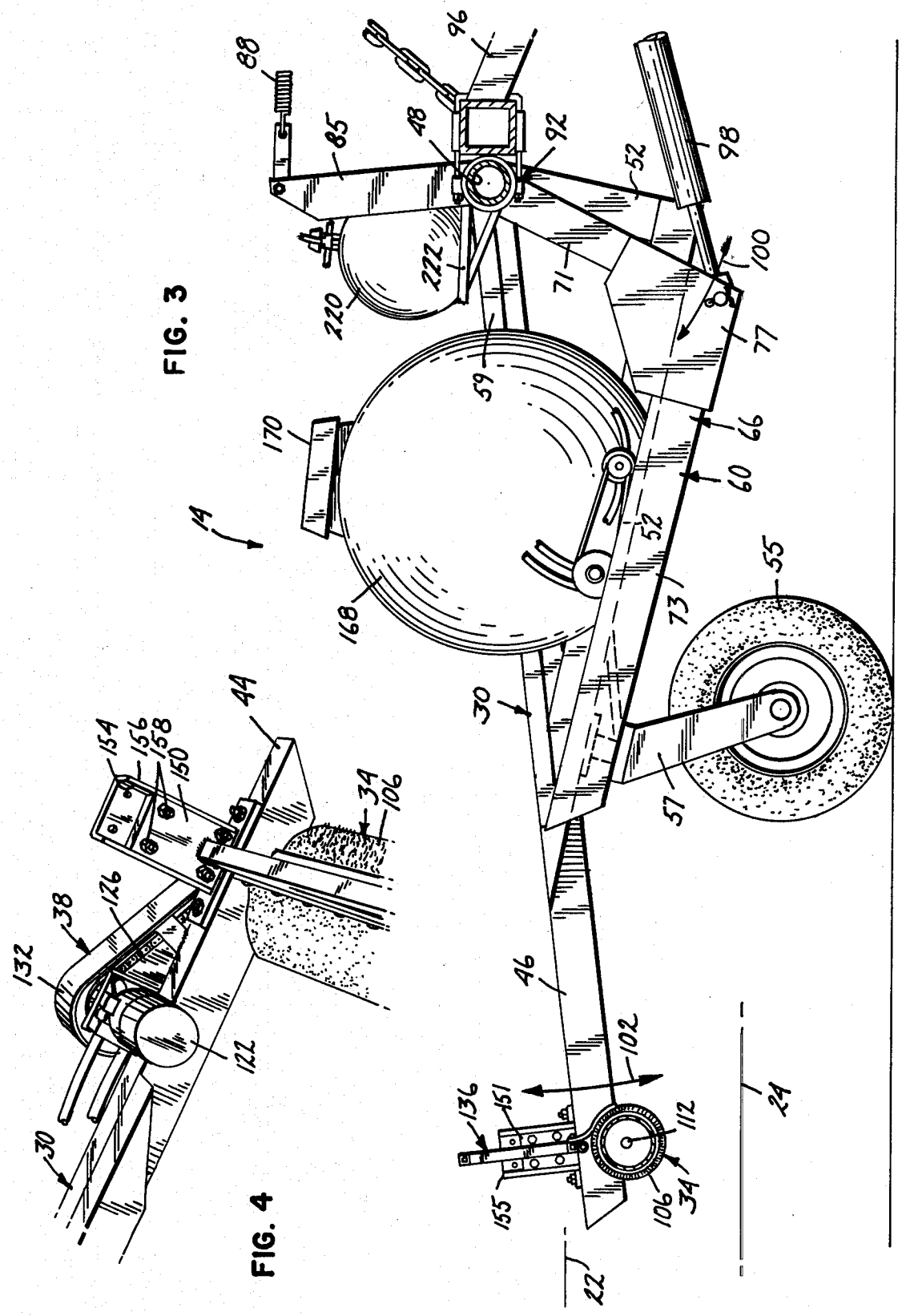

HERBICIDE APPLICATOR

FIELD OF THE INVENTION

This invention relates to the agricultural industry and specifically to the application of herbicide to tall weeds such as quackgrass which stick up above a normal crop.

BACKGROUND OF THE INVENTION

Presently there are basically two types of herbicides in use. The first type of herbicide is generally applied to the total area of cultivation, and selectively discriminates between the desirable crops and the undesirable weeds, destroying only the latter. In contrast, the second type of herbicide destroys any growing plant to which it is applied. The second type generally tends to be more effective but unique problems are encountered in that application to desirable crops will have the effect of destroying them also. Because various weeds such as quackgrass and the like frequently extend above the upper reaches of the desirable crop, it is advantageous to devise a method by which this second type of herbicide can be applied to the weeds which extend above the desirable crop.

Because the height of both the crops and the weeds vary within any particular acreage, it is advantageous to selectively and continuously control the height at which the herbicide is applied. Similarly, the density of weeds can vary from one acreage to another. In those areas of higher density, it becomes necessary to apply greater volumes of herbicide to the weeds. However, application of great amounts of a nonselective herbicide to weeds creates a serious problem of excess herbicide dripping to the ground. If the herbicide drips too much, an excessive herbicide residue is left behind which kills the desirable crop.

PRIOR ART

A number of devices have been developed for applying herbicide to tall weeds and the like. The J. B. Crane U.S. Pat. No. 2,935,818 issued May 10, 1960 discloses a wheeled vehicle for applying a weed killing solution. The vehicle has a pair of horizontal rolls 18 and 20 which are rotated in opposite directions by a suitable mechanism. The rolls are covered by a layer of absorbent material, such as thick felt or the like, on which the weed killing solution is sprayed by means of a series of spray nozzles 50.

Another such device is disclosed in the J. A. McKirdy U.S. Pat. No. 4,019,278 issued Apr. 26, 1977 in the form of a weed bar assembly 26 which includes hollow tubes 27 and 28 which are fed liquid from a holding tank 22 by means of hose connections 30 and curved tubular connections 29A. The tubes 27 and 28 are constructed so that liquid contained within the tubes will feed to the outer surfaces of the tubes and maintain a film thereon. Tube 27 is preferably made of plastic and is porous so that fluids will seep through the wall of the tube. Tube 28 is preferably covered with a sleeve of cloth or wicklike material 45 which is fed by means of drillings 46 through the wall of the tube so that it may be maintained in a moist condition. Weed bar assembly 26 can be raised or lowered relative to the ground by means of fluid operators 27A. The weed bar assembly further includes a filtering unit and metering valve 47A connecting hose 30 and tank 22 which is actuated by assembly 48 or a low pressure pump. One embodiment shown in FIG. 7 and described in column 4, line 59 to column 5, line 4 discloses that the tubes 27 and 28 can be mounted for free rotation due to frictional engagement with the foliage across which they are pulled.

Another weed killing device is disclosed in the U.S. patent to R. A. Biron, U.S. Pat. No. 3,320,694 issued May 23, 1967. The device is in the form of a herbicide dispenser comprising an elongated distribution bar, including a metal or plastic tube 40 having spaced perforations 42 along its length and having one end closed and the other end coupled to a tube 34 which supplies chemicals from tank 18. A porous sleeve 38, which may be made of cloth, woven metal strands or composite porous material such as sintered particles of metal, fits closely but slidably over tube 40 and is secured at its ends. Apparatus are also prpvided as described at column 1, line 70 to column 2, line 9 for manually raising and lowering the position of tube 40. The tank or chemicals reservoir 18 which feeds tube 40 is pressurized by means of hand pump 32 or gas from cylinder 28 applied through tube 22, pressure regulator 24 and outlet header 26.

SUMMARY OF THE INVENTION

Applicants have invented a new and useful herbicide applicator apparatus which can be used with a nonselective herbicide. Applicants have further invented a herbicide applicator apparatus which prevents excessive dripping of the herbicide and which is adjustable in accordance with both varying weed density and height.

The herbicide applicator according to the present invention selectively applies the herbicide to tall weeds and the like extending above the desirable plant growth as the vehicle moves over the ground. The apparatus includes an elongated roller having an absorbent outer surface and a generally horizontal longitudinal axis, a support frame and means carried by the support frame for mounting the roller for rotational movement thereof about the horizontal axis. The apparatus further includes means carried by the support frame for rotating the roller about the axis in a direction to cause upward wiping movement of the absorbent outer surface against the tall weeds and the like as the vehicle moves over the ground. The apparatus is further provided with means for controlling the rotational speed of the roller, means carried by the support frame for supplying herbicide to the outer surface of the roller, means for controlling the amount of herbicide supplied to the outer surface of the roller, as well as means for adjusting the height of the support frame so as to permit the operator to position the roller at a selected height to engage the tall weeds and the like while passing over desirable plant growth. The apparatus according to the present invention gives the operator quick and easy control over different weed density and height parameters encountered during normal operations.

The apparatus according to the present invention can further include a wiper and a means for mounting the wiper in rubbing contact with the outer surface of the roller so as to cause a foamable herbicide applied to the outer surface to foam when rubbed by the wiper. The wiper further keeps the excess of the herbicide from dripping on the ground and also spreads the herbicide evenly and thoroughly over the outer absorbent surface of the roller.

BRIEF DESCRIPTION OF THE DRAWINGS

FIG. 3 is an enlarged sectional view taken generally along line 3—3 of FIG. 2;

FIG. 4 is a fragmentary detailed view showing the drive mechanism for the roller;

DETAILED DESCRIPTION OF THE PREFERRED EMBODIMENT

Figure 1:
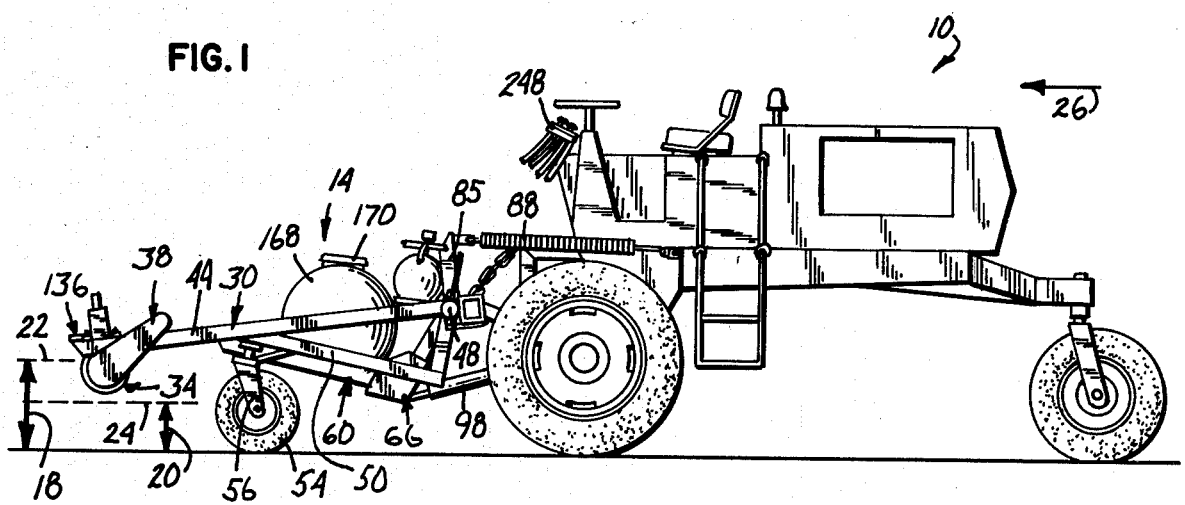
FIG. 1 is a view in side elevation of the herbicide applicator of the present invention, mounted on a self-propelled vehicle.

Referring to the drawings, FIG. 1 shows a self-propelled swather or other form of motor driven vehicle generally designated as 10 propelling a herbicide applicating apparatus according to the present invention generally designated as 14. Arrow 18 indicates the height above the ground of weed line 22, while arrow 20 indicates the height above the ground of crop line 24. As shown in FIG. 1, weed line 22 is higher than crop line 24. In order for apparatus 14 to properly work, there must be some height differential between crop line 24 and weed line 22. Preferably this height differential should be at least six inches, depending on various factors, including the experience of the operator using the apparatus. As shown in FIG. 1, vehicle 10 moves in the direction indicated by arrow 26 so as to move apparatus 14 into contact with tall weeds and the like growing above crop line 24.

Figure 2:
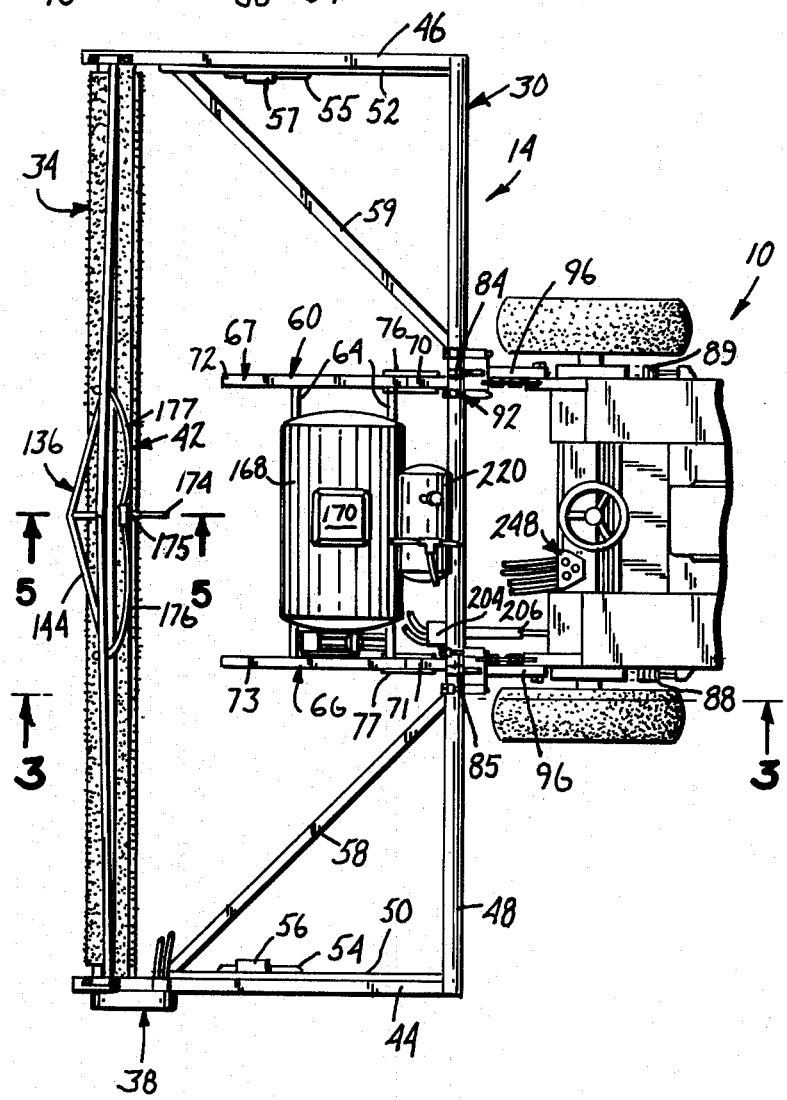
FIG. 2 is a view in top plan thereof, portions being broken away.

As shown in FIGS. 1-3, apparatus 14 includes a mobile support frame designated as 30, an elongated roller for applying the herbicide designated as 34, a device designated as 38 for imparting rotational movement to roller 34 and an apparatus generally indicated by numeral 42 for supplying a flow of herbicide to roller 34. Frame 30 includes a pair of spaced elongated side arms 44 and 46 which are secured to each end of a cylindrical main support member 48. A pair of generally V-shaped braces 50 and 52 are provided on the underside of frame 30, one free end of each brace being secured to the inside of one of the elongated arms, the other free end of each brace being secured to the underside of member 48 near one end thereof.

As shown particularly in FIGS. 1 and 3, a pair of wheels 54 and 55 are provided, each wheel being mounted to the underside of one of the V-shaped braces 50, 52 by means of wheel mounts 56 and 57 respectively. Wheels 54 and 55 serve to support frame 30 when apparatus 14 is in use. A pair of diagonal braces 58 and 59 are also provided to give additional structural support to frame 30. One end of each brace 58, 59 is being secured to one of the V-shaped braces 50, 52, and the other end is secured to member 48 as shown in FIG. 2.

As shown in FIG. 2, a carriage structure generally designated as 60 is located between arms 44 and 46. Carriage 60 includes support members 64 and a pair of V-shaped cradle arms 66 and 67 which are fixedly secured to member 48. As shown particularly in FIGS. 1 and 3, the cradle arms 66, 67 include first beams 70 and 71 which extend generally frontwardly and downwardly from member 48 and second beams 72 and 73, respectively, to which support members 64 are secured. Members such as brackets 76 and 77 respectively are provided to fixedly join each first and second beam.

As also shown in FIGS. 1 and 3, a pair of spaced uprights 84 and 85 are provided which are secured to member 48 slightly outside of the points of connection of carriage 60 and which extend generally upwardly therefrom. A pair of elongated springs 88 and 89 are provided, one end of each spring being connected to one of the uprights, the other end of each spring being secured to vehicle 10 for sliding movement within a bracket not shown.

As shown in FIG. 3, a bearing mount 92 is provided on each side of uprights 84 and 85. Member 48 is journaled on either side of uprights 84 and 85 for pivotal movement about a generally horizontal longitudinal axis within mount 92 along its entire length. Mount 92 is secured to a frame 96 only part of which is shown by means of suitable brackets such as 94. Frame 96 is mounted on the front end of vehicle 10.

In order to impart pivotal movement to frame 30 and thereby elevational control to roller 34, a pair of hydraulic rams 98 are provided. One end of each ram 98 is pivotally secured to one of the members 76 and 77 as shown in FIGS. 1 and 3, while the other end is mounted on vehicle 10 by means not shown. Extension and retraction of rams 98 is controlled from vehicle 10 by the operator thereof by means not shown so that frame 30 pivots about member 48 through an arc indicated by arcuate arrow 100. As frame 30 pivots about member 48 the frontward ends of arms 44 and 46 are raised in unison upwardly or downwardly as indicated by arrow 102, thus raising and lowering roller 34.

Figure 5:
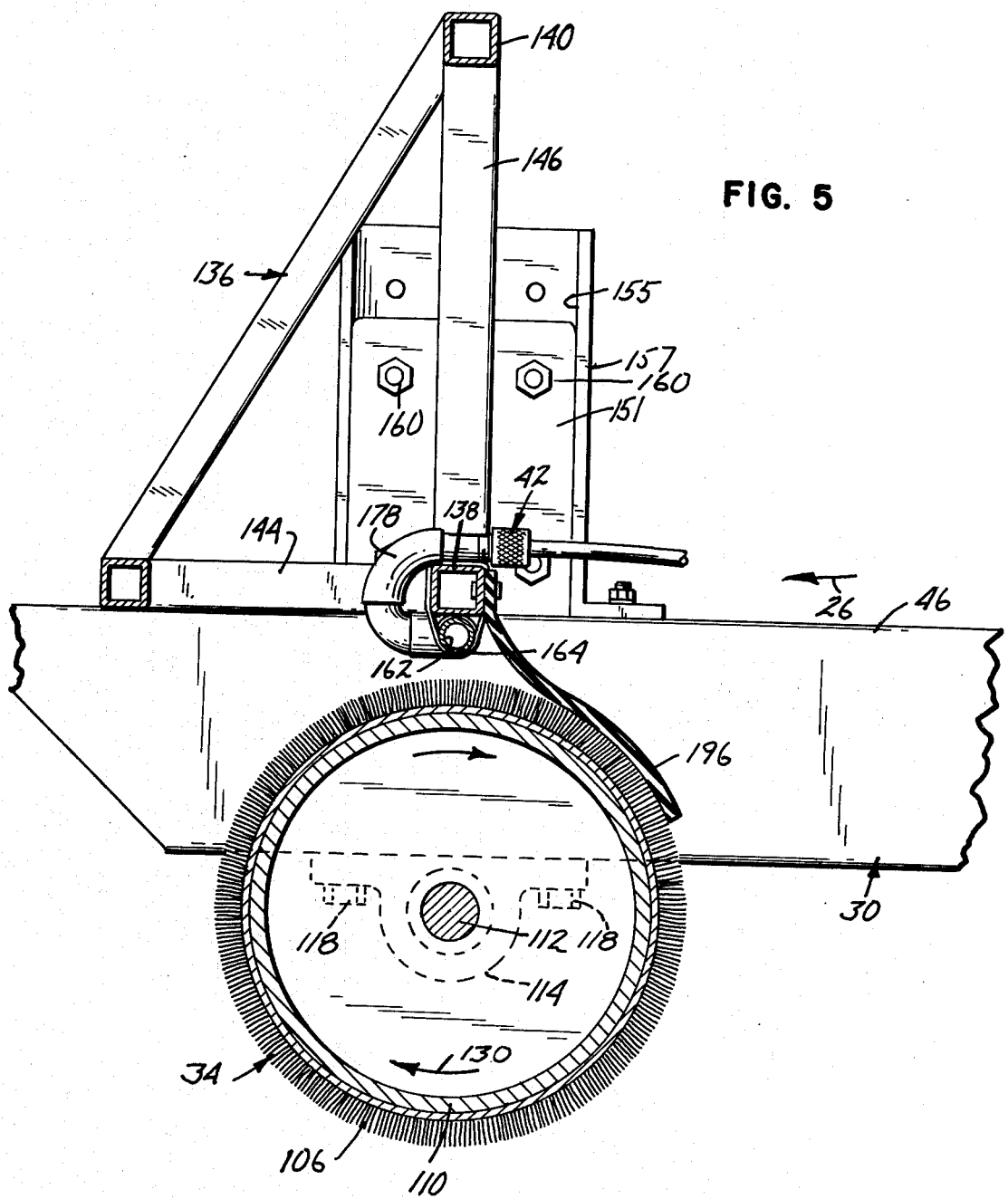
FIG. 5 is an enlarged sectional view taken generally along line 5—5 of FIG. 2.

Referring now in particular to FIG. 5, roller 34, which preferably is generally cylindrically shaped, includes an outer absorbent surface 106 and an inner elongated drum 110. Surface 106 is preferably formed from a covering of nap material such as nylon-dacron carpeting, the nap on the carpet being preferably one-half to three-quarters of an inch. Drum 110 is preferably formed from a cylindrical hollow pipe having a suitable diameter such as eight inches. Because the herbicide compositions which are used with apparatus 14 are generally highly corrosive, drum 110 is preferably painted with a corrosion resistant paint prior to the time that surface 106 is glued on. Each end of drum 110 is provided with pins 112 which are journaled for rotation within bearing brackets 114. The brackets 114 are mounted on the underside of each arm 44 and 46 by bolt-nut combinations 118. The roller 34 thereby held for rotation about its generally horizontal longitudinal axis.

Referring now in particular to FIG. 4, a mechanism is provided for imparting rotational movement to roller 34 about its axis of rotation. The mechanism includes a fluid pressure actuated motor 122 which is connected in driving engagement with roller 34 by means of a chain 126. As shown in FIG. 5, motor 122 in combination with chain 126 serves to impart rotational movement to roller 34 in the direction indicated by arrow 130 to cause upward wiping movement of surface 106 against tall weeds and the like as vehicle 10 moves over the ground. A chain guard 132 can also be provided.

As shown particularly in FIG. 5, a mounting frame generally designated as 136 is provided above roller 34. Frame 136 includes a generally horizontal bar 138, a vertical inverted V-shaped brace 140 extending the entire length of bar 138 and a smaller V-shaped horizontal brace 144 secured to bar 138 between the ends thereof as shown in FIG. 2. A plurality of struts or smaller braces can be provided for additional support to frame 136 such as indicated at 146.

As shown in FIGS. 4 and 5, a pair of vertical rectangular plates 150 and 151 are fixedly secured to each end of bar 138 and vertical brace 140. These end plates slide within channels 154 and 155 respectively, formed by mounting brackets 156 and 157 which are mounted onto the top side of arms 44 and 46. Holes are provided in both the end plates and the mounting brackets so that frame 136 can be vertically adjusted with respect to roller 34 by means of a plurality of bolt-nut combinations 158 and 160.

Referring in particular to FIG. 5, apparatus 42 includes a cylindrical elongated pipe 162 which is mounted by suitable means to the underside of bar 138 and is positioned over roller 34. Pipe 162 preferably formed from a one-half inch inside diameter plastic pipe and is provided with a plurality of perforations 164 along the length thereof through which the herbicide exits onto surface 106. As shown in FIGS. 2 and 3, apparatus 42 further includes a hollow cylindrical herbicide supply tank 168 having a refill opening 170 in the top thereof. The bottom of tank 168 is mounted by suitable means onto support members 64 of carriage 60. The herbicide in tank 168 supplies a central primary supply line 174, also shown in FIG. 6 which is connected to a T-joint 175 which branches out into secondary supply lines 176 and 177 which feed pipe 162 with a flow of herbicide. Lines 176 and 177 are connected to pipe 162 by means of a J-shaped coupling member 178 as shown in FIG. 5.

Figure 6:
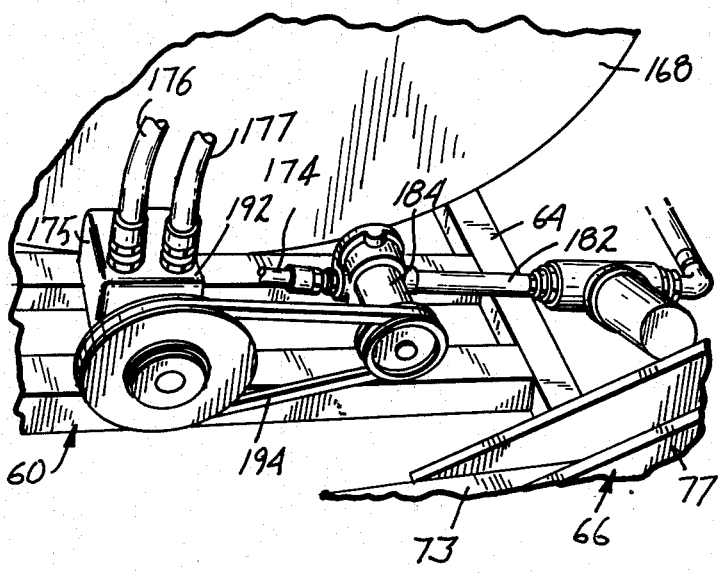
FIG. 6 is an enlarged fragmentary detailed view of a portion of the herbicide pump.

Referring to FIG. 6, the herbicide is pumped from tank 168 to line 174 by means of an inlet line 182 which is shown in a disconnected position but which is normally connected to the underside or bottom of tank 168. A pump 184 is connected to line 182 and serves to draw the herbicide from tank 168 through line 182, direct it into line 174, and thus cause the herbicide to flow out of pipe 162 through perforations 164. Pump 184 is actuated through the use of a fluid pressure actuated motor 192 which is connected in driving engagement with pump 184 by means of drive belt 194.

Referring now in particular to FIG. 5, a wiper 196 is secured to bar 138 and extends generally rearwardly and downwardly therefrom so as to be in rubbing contact with surface 106. Wiper 196 is preferably formed from a generally rectangular piece of elongated resilient belting and has one long edge secured to bar 138. Because it is preferred that the herbicide supplied to pipe 162 be in foamable form when applied to the weeds, the rubbing action created as surface 106 rotates against the entire length of wiper 196 causes the herbicide to foam up. Wiper 196 also serves to spread the herbicide evenly and to prevent the excess flow of herbicide from dripping off outer surface 106. In a preferred embodiment, the outer surface 106 can hold up to eight gallons of herbicide if roller 34 is 20 feet in length and is rotating.

Figure 7:
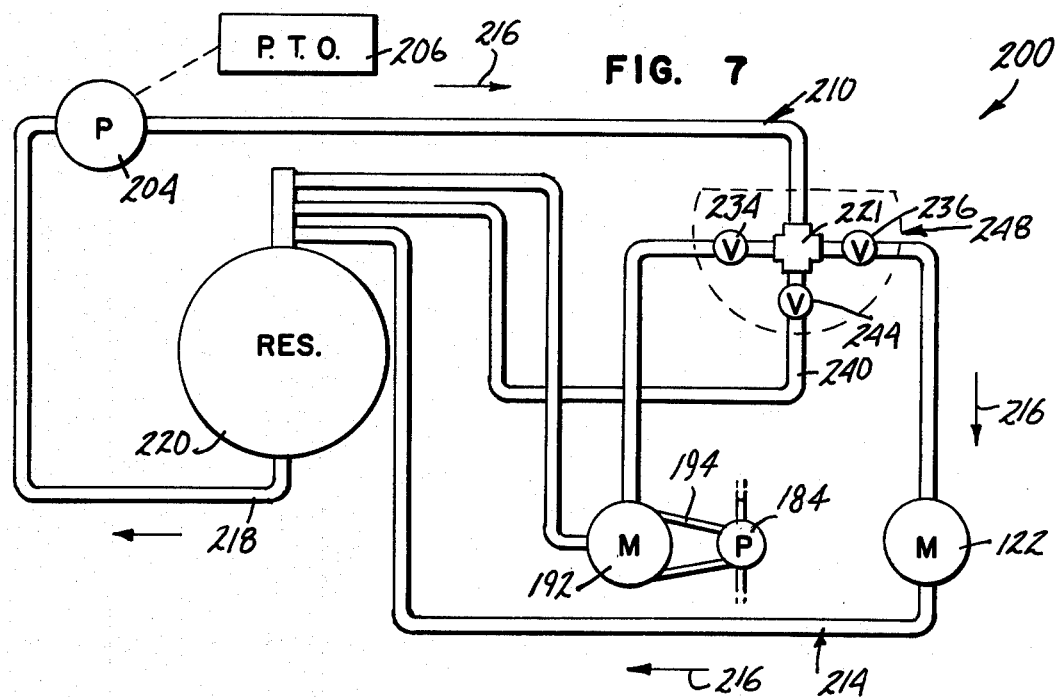
FIG. 7 is a diagrammatic view of the control system for the present invention.

In order to allow the application of herbicide by apparatus 14 to be varied according to the particular conditions involved, a control system generally designated as 200 is provided. The schematic is shown in FIG. 7. System 200 includes a primary pump 204 which is driven by a power take off (PTO) 206 from vehicle 10. The particular location of pump 204 and PTO 206 are indicated in FIG. 2. System 200 further includes a fluid pressure system generally designated as 210 for controlling the supply of herbicide to surface 106 of roller 34 and a fluid pressure system generally designated as 214 for controlling the rotational speed of roller 34. Pump 204 moves a suitable fluid such as oil through systems 210 and 214 in the direction indicated by arrows 216. Systems 210 and 214 share a common line 218 which runs through pump 204 and has one end connected to a fluid pressure reserve tank 220. The other end of common line 218 is connected to four way connection member or joint 221. Tank 220 is shown in FIGS. 1–3 as being mounted on a support carriage 222 secured to member 48. The herbicide control system 210 runs through motor 192 and has one end connected to member 221, the other end being connected to reserve tank 220. The rotational speed control system runs through motor 122 and has one end connected to member 221 while the other end is connected to reserve tank 220. A valve 234 is provided for system 210 in order to vary the fluid pressure going to motor 192. A valve 236 is provided for system 214 for controlling the fluid pressure to motor 122. A pressure relief line 240 is also provided and has one end connected to member 221 while the other end is connected to reserve tank 220. A pressure relief valve 244 is provided in line 240.

Valves 234, 236 and 244 serve to make up a control panel designated as 248, also shown in FIGS. 1 and 2, as being located on the front end of vehicle 10. Thus, the operator can selectively control the valve operation governing the supply of herbicide to outer surface 106 of roller 34 as well as the rotational speed of roller 34. While system 200 is shown as utilizing fluid pressure systems as a preferred method for controlling the various motors, it should be understood that other methods of controlling the various motors known in the art, e.g. an electrical system, can be utilized within the scope of the present invention. Also, if desired, systems 210 and 214 can be separate and independent as opposed to sharing a common line 218.

IN OPERATION

In order to operate the apparatus according to the present invention, tank 168 is filled with a suitable herbicide. So that the herbicide may be foamable when rubbed, the herbicide should include a suitable foaming agent. When the apparatus is hitched to a suitable vehicle, it is then moved over the weed infested area to be treated. As the apparatus is moved over the weed infested area, the speed of rotation of the roller, its height above the ground and the quantity of herbicide supplied to the roll is controlled by the operator from the vehicle.

The main object in utilizing the apparatus of the present invention is to keep the outer absorbent surface of roller 34 saturated so that it can apply a sufficient amount of herbicide to the weeds, yet not so much that the herbicide excessively drips onto the desired crop. For example, as weed density increases, a greater flow of herbicide is necessary to maintain an effective level of application of the herbicide to the weeds. As dense areas of weeds are encountered, the rotational rate of the roller must also be increased so as to keep up with the rate of flow of the herbicide being supplied thereto. In contrast, as weed density decreases, the flow of herbicide and the rotational speed of the roller must be decreased to prevent excessive dripping of the herbicide onto the desirable crop below. Suitable adjustment of valves 234 and 236 on the control panel permits the operator of the vehicle to quickly and easily adjust both the rotational rate of the roller and the rate of flow of the herbicide supplied to the outer absorbent surface of the roller in accordance with the weed density encountered.

Because the height of the weeds, as well as the height of the weed line relative to the height of the crop line, can vary, the height of the roller must also be varied in accordance with the particular conditions involved. For instance, if the crop line is high relative to the weed line, the operator must raise the roller in order to ensure that excessive amounts of herbicide are not applied to the desirable crops. In contrast, if the crop line is low relative to the weed line, the roller can be lowered to apply a more effective amount of herbicide to the weeds. By adjusting the extension and contraction of the hydraulic rams, the operator can continuously maintain control of the elevation of the roller depending upon the crop line-weed line conditions encountered.

When it is desirable to idle the apparatus before the weed infested area is reached, valves 234 and 236 are closed and valve 244 opened. By so doing, a closed circulating system is formed by lines 218 and 240 which renders inoperative systems 210 and 214. Thus, Applicants have invented an extremely useful herbicide applicator apparatus which can be utilized very effectively under various kinds of weed density and height parameters.

What is claimed is:

1. An apparatus for use with a vehicle with a power source for selectively applying herbicide to weeds and the like comprising:
   an elongated roller having an absorbent outer surface and a generally horizontal longitudinal axis;
   a support frame;
   means carried by said support frame for mounting said roller for rotational movement of said roller about said axis;
   means coupled to said roller and said power source for rotating said roller about said axis in a direction to cause upward wiping movement of said absorbent outer surface against weeds and the like as the vehicle is moved forwardly over the ground, whereby herbicide is applied to the underside of the weed leaves as the leaves are contacted by the roller; means coupled to said power source for supplying herbicide to said outer surface of said roller;
   means for controlling the amount of herbicide appllied to weeds by said roller, said control means being operable by an operator as varying weed conditions are encountered to adjust the amount of herbicide applied to the weeds, said herbicide apication control means including flow control means, said flow control means being independently controllable relative to said power source for controlling the amount of herbicide supplied to said outer surface of said roller; and speed control means for controlling the rotational speed of said roller, said speed control means being independently controllable relative to said power source whereby the amount of herbicide supplied to the roller and the rotational speed of the roller can be adjusted by the operator as varying weed conditions are encountered such that an effective amount of herbicide is applied to the weeds without herbicide dripping from said roller with said vehicle and power source operating at a given speed,
   a wiper made from a substantially imperforate, non-bristle material;
   means mounting said wiper with a portion of said wiper adjacent a free edge of the wiper in rubbing contact with said outer surface of said roller along the length thereof whereby herbicide can be applied generally evenly along the length of said roller.

2. An apparatus according to claim 1 wherein said herbicide supply means comprises a pump for causing the herbicide to flow onto said outer surface of said roller and a fluid pressure actuated motor connected in driving engagement with said pump and wherein said herbicide flow controlling means comprises a fluid pressure system to actuate said motor and means positioned along said system for controlling the fluid pressure therein.

3. An apparatus according to claim 1 wherein said rotating means comprises a fluid pressure actuated motor and means for connecting said motor in driving engagement with said roller.

4. An apparatus according to claim 3 wherein said rotational speed controlling means comprises a fluid pressure system connected to said motor and means positioned along said system for controlling the fluid pressure therein.

5. An apparatus according to claim 4 wherein said herbicide supply means comprises a fluid pressure motor actuated pump for causing the herbicide to flow onto said outer surface of said roller and a fluid pressure motor driving said herbicide supply pump, and wherein said herbicide flow controlling means comprises a second fluid pressure system connected to said herbicide supply pump motor and means positioned along said herbicide fluid pressure system to adjust the fluid pressure within said herbicide fluid pressure system, a portion of said herbicide fluid pressure system and said rotational speed fluid pressure system having a common fluid pressure line.

6. An apparatus according to claim 5 further comprising a fluid pressure reservoir, one end of said common line, one end of said herbicide fluid pressure system and one end of said rotational speed fluid pressure system being connected to said fluid pressure reservoir, a four-way connection member, the other end of said common line, the other end of said herbicide fluid pressure system and the other end of said rotational speed fluid pressure system being connected to said connection member, and a fluid pressure release line having one end connected to said connection member, the other end of said fluid pressure release line being connected to said fluid pressure reservoir.

7. An apparatus according to claim 1 wherein said wiper mounting means comprises a monting frame mounted on said support frame and above said roller, said wiper being elongated and extending generally downwardly from said mounting frame and further being in rubbing contact along substantially the full length of said outer surface of said roller.

8. An apparatus according to claim 1 or 7 wherein said roller is generally cylindrical shaped and wherein said outer surface of said roller comprises a covering of napped material.

9. An apparatus according to claim 8 wherein said herbicide supply means comprises an elongated hollow cylindrical pipe mounted near and above said outer surface of said roller and running along substantially the entire length thereof, and having a plurality of perforations therein through which said herbicide exits onto said outer surface of said roller.

10. An apparatus according to claim 1 wherein said support frame comprises a pair of spaced elongated arms, said roller mounting means rotatably mounting said roller between said arms.

11. An apparatus according to claim 10 wherein said wiper mounting means comprises a mounting frame mounted above said roller and having first and second ends mounted on said arms, and wherein said wiper is in rubbing contact along the entire length of said outer surface of said roller.

12. An apparatus according to claim 11 wherein said wiper comprises an elongated piece of belting secured to said mounting frame and extending generally downwardly therefrom.

13. An apparatus according to claim 11 wherein said support frame further comprises an elongated rotatable member, one end of each of said arms being fixedly connected to first and second ends of said rotatable member, and a pair of spaced beams, each of said beams being fixedly connected to said rotatable member, and further comprising height adjustment means constituted by a second frame, means for pivotally mounting said rotatable member on said second frame for pivotal movement about a fixed generally horizontal axis, a pair of hydraulic rams having first and second ends and means for connecting said first ends of said rams to said beams, said second ends of said rams being mountable on the vehicle.

14. An apparatus according to claim 1 including:
means for adjusting the height of said support frame to thereby permit an operator to position said roller at a selected height to engage the weeds or the like while passing over desirable plant growth.

15. An apparatus according to claim 1 in combination with a motor vehicle for moving said support frame over the ground, said motor vehicle including means for raising and lowering said support frame to position said roller at a selected height.

16. An apparatus for use with a motor vehicle for selectively applying herbicide to weeds and the like as the vehicle moves over the ground, comprising:
an elongated roller having an absorbent outer surface and a generally horizontally extending axis;
a support frame;
means carried by said support frame for mounting said roller for rotational movement of said roller about said axis;
means for rotating said roller about said axis in a direction to cause upward wiping movement of said absorbent outer surface against tall weeds and the like as the vehicle moves over the ground, said rotating means being comprised of a fluid pressure actuated motor and means for connecting said motor in driving engagement with said roller;
means for controlling the rotational speed of said roller, said rotational speed controlling means being comprised of a fluid pressure system connected to said motor and means positioned along said system for controlling the fluid pressure therein;
means for supplying herbicide to said outer surface of said roller, said herbicide supply means being comprised of fluid pressure motor actuated pump for causing the herbicide to flow onto said outer surface of said roller and a fluid pressure motor driving said herbicide pump;
means for controlling the amount of herbicides supplied to said outer surface of said roller, said herbicide controlling means being comprised of a second fluid pressure system connected to said herbicide supply pump motor and means positioned along said herbicide fluid pressure system to adjust the fluid pressure within said herbicide fluid pressure system, a portion of said herbicide fluid pressure system and said rotational speed fluid pressure system having a common fluid pressure line; and
a fluid pressure reservoir, one end of said common line, one end of said herbicide fluid pressure system and one end of said rotational speed fluid pressure system being connected to said fluid pressure reservior, a four-way connection member, the other end of said common line, the other end of said herbicide fluid pressure system and the other end of said rotational speed fluid pressure system being connected to said connection member, and a fluid pressure release line having one end connected to said connection member, the other end of said fluid pressure release line being connected to said fluid pressure reservoir.

17. An apparatus for supplying a herbicide to tall weeds and the like, comprising:
a mobile support frame;
an elongated roller having an absorbent outer surface and a generally horizontal longitudinal axis;
means for rotatably mounting said roller on said support frame for rotational movement about said axis so as to engage said tall weeds and the like as said support frame is moved over the ground surface;
means for rotating said roller about said axis;
means for adjusting the height of said roller relative to the ground surface;
means for supplying a flow of herbicide to said outer surface of said roller;
a wiper;
means for mounting said wiper in rubbing contact with said outer surface of said roller;
said mobile support frame being comprised of a pair of spaced elongated arms, an elongated rotatable member, one end of each of said arms being fixedly connected to first and second ends of said elongated rotatable member, and a pair of spaced beams, each of said beams being fixedly connected to said rotatable member;
said roller mounting means rotatably mounting said roller between said arms;
said wiper mounting means being comprised of a mounting frame carried above said roller and having a first end mounted on one of said arms and a second end mounted on the other of said arms, said wiper being in rubbing contact along substantially the entire length of said outer surface of said roller;
said height adjusting means being comprised of a second frame, means for pivotally mounting said rotatable member on said second frame for pivotal movement about a fixed generally horizontal axis, a pair of hydraulic rams having first and second ends and means for connecting said first ends of said rams to said beams, said second ends of said rams being mountable on the mobile support frame.

18. An apparatus according to claim 1 wherein said wiper is flexible.

* * * * *